US007740192B2

(12) United States Patent
Chen

(10) Patent No.: US 7,740,192 B2
(45) Date of Patent: Jun. 22, 2010

(54) ROTATING BI-DIRECTIONAL PNEUMATIC GUN

(76) Inventor: Kuo-Liang Chen, No. 246-1, Changma Rd., Changhua (TW)

(*) Notice: Subject to any disclaimer, the term of this patent is extended or adjusted under 35 U.S.C. 154(b) by 1029 days.

(21) Appl. No.: 11/475,890

(22) Filed: Jun. 28, 2006

(65) Prior Publication Data

US 2008/0011881 A1 Jan. 17, 2008

(51) Int. Cl.
*F16K 11/07* (2006.01)

(52) U.S. Cl. ........................ 239/447; 239/436; 251/351; 137/625.48

(58) Field of Classification Search ................. 239/436, 239/438, 443, 446, 447, 456; 251/351; 137/625.48
See application file for complete search history.

(56) References Cited

U.S. PATENT DOCUMENTS

| | | | | |
|---|---|---|---|---|
| 3,327,949 | A * | 6/1967 | Eull | 239/412 |
| 3,514,042 | A | 5/1970 | Freed | |
| 3,985,156 | A | 10/1976 | Walker | |
| 5,242,116 | A * | 9/1993 | Ronezzi | 239/438 |
| 5,806,770 | A * | 9/1998 | Wang | 239/391 |
| 5,979,800 | A * | 11/1999 | Takagi | 239/440 |
| 6,070,810 | A | 6/2000 | Chen et al. | |
| 7,434,751 | B1 * | 10/2008 | Chen | 239/526 |

* cited by examiner

*Primary Examiner*—Troy Chambers
(74) *Attorney, Agent, or Firm*—Muncy, Geissler Olds & Lowe, PLLC

(57) ABSTRACT

A rotating bi-directional pneumatic gun has a body and a guiding tube mounted rotatably in the body. The guiding tube has an outer surface, a front notch, a rear notch, a front groove and a rear groove. The front notch and the rear notch are defined longitudinally in the outer surface of the guiding tube and are kept from communicating with each other. The front groove and the rear groove communicate respectively with the front notch and the rear notch and each have multiple inclined bores extending respectively toward the front end and the rear end of the barrel. Rotating the guiding tube can change the direction of air flow of the pneumatic gun, and the rotating bi-directional pneumatic gun is convenient to operate and easy to assemble.

9 Claims, 8 Drawing Sheets

ROTATING BI-DIRECTIONAL PNEUMATIC GUN

BACKGROUND OF THE INVENTION

1. Field of Invention

The present invention relates to a rotating bi-directional pneumatic gun, and more particularly to a rotating bi-directional pneumatic gun that is convenient to operate and easy to assemble.

2. Description of the Related Art

With reference to FIGS. 6-8, a conventional bi-directional pneumatic gun has a body (60), a guiding tube (70) and a connecting tube (80). The body (60) has a barrel (61) and a handle (62) mounted on the barrel. The barrel (61) has a front end (611), a rear end (612), a front passage (613) having an diameter, a rear passage (614) having an diameter, a blocking shoulder (615) and an inner thread (616). The diameter of the front passage (613) is smaller than the diameter of the rear passage (614) so as to define the blocking shoulder (615) between the front passage (613) and the rear passage (614). The inner thread (616) is formed in the rear end (612) of the barrel (61).

The handle (62) has a chamber (621), a connecting passage (622) and a valve device (623). The chamber (621) is connected to a compressed air source. The connecting passage (622) communicates with the rear passage (614) of the barrel (61). The valve device (623) is mounted between the chamber (621) and the connecting passage (622). When the valve device (623) is on, the connecting passage (622) is communicated with the chamber (621).

The guiding tube (70) is held in the rear passage (614) of the barrel (61) and has two ends (71), two seals (72) and a guiding slot (73). The seals (72) are mounted respectively around the ends (71) of the guiding tube (70). The guiding slot (73) has a sidewall and multiple inclined bores (731) defined through the sidewall.

The connecting tube (80) is connected to the rear end (612) of the barrel (61) and has an outer thread (81). The outer thread (81) is screwed with the inner thread (616) of the barrel (61) to fix the guiding tube (70) in the rear passage (614) of the barrel (61).

With reference to FIG. 7, the inclined bores (731) face toward the rear end (612) of the barrel (61). When the valve device (623) is on, compressed air in the chamber (621) flows through the connecting passage (622) and the inclined bores (731) and flows toward the rear end (612) of the barrel (61) such that the conventional bi-directional pneumatic gun can be served as a suction device.

With reference to FIG. 8, when air is needed to flow toward the front end (611) of the barrel (61), the connecting tube (80) is detached from the barrel (61), the guiding tube (70) is inserted into the barrel (61) in reverse and the connecting tube (80) is reattached to the barrel (61). Therefore, the inclined bores (731) face toward the front end (611) of the barrel (61). Accordingly, air flows toward the front end (611) of the barrel (61) and the conventional bi-directional air gun can be served as a blower when the valve device (623) is on.

However, changing the direction of air flow is inconvenient for a user because disassembling the conventional bi-directional air gun is necessary and takes time. Furthermore, the guiding tube (70) has two seals (72) mounted respectively on the ends (71). After a long time of use, the seals (72) may be deteriorated and stick inside the barrel (61). To knock the barrel (61) is necessary to take the seal (72) out from the barrel (61), and this easily damages the conventional bi-directional pneumatic gun.

U.S. Pat. No. 6,070,810, which has a common inventor with the present invention, disclosed another conventional bi-directional compressed air outlet having a tubular body and a middle member received movably in the tubular body. Changing the direction of air flow can be achieved by moving the middle member. However, force of sucking or blowing of this conventional bi-directional compressed air outlet may be weak because the middle member is short. In addition, the conventional bi-directional pneumatic guns have multiple components and are usually assembled by manual work. Air tightness and quality of the conventional bi-directional pneumatic guns may be affected by carefulness and precision of assembling.

To overcome the shortcomings, the present invention provides a rotating bi-directional pneumatic gun to mitigate or obviate the aforementioned problems.

SUMMARY OF THE INVENTION

The primary objective of the present invention is to provide a rotating bi-directional pneumatic gun that is convenient to change the direction of air flow and is easily assembled.

Another objective of the present invention is to provide a rotating bi-directional pneumatic gun that can prevent seals sticking in the barrel.

A tertiary objective of the present invention is to provide a rotating bi-directional pneumatic gun that has a prolonged guiding tube to provide an enhanced sucking or blowing force.

The rotating bi-directional pneumatic gun in accordance with the present invention comprises a body and a guiding tube. The body has a barrel and a handle. The barrel has a front end, a rear end, a passage having a diameter and an outer surface. The handle is attached on the outer surface of the barrel and has a chamber, a connecting passage and a valve device. The connecting passage communicates with the passage of the barrel. The valve device is mounted between the chamber and the connecting passage and communicates the connecting passage with the chamber when the valve device is on.

The guiding tube is mounted rotatably in the passage of the barrel and has an outer surface, a front notch, a rear notch, a front groove and a rear groove. The front notch is defined longitudinally in the outer surface of the guiding tube. The rear notch is defined longitudinally in the outer surface of the guiding tube and is kept from communicating with the front notch. The front groove is defined in the outer surface of the guiding tube, communicates with the front notch and has a sidewall and multiple inclined bores defined through the sidewall and extending toward the front end of the barrel. The rear groove is defined in the outer surface of the guiding tube, communicates with the rear notch and has a sidewall and multiple inclined bores defined through the sidewall and extending toward the rear end of the barrel.

Other objectives, advantages and novel features of the invention will become more apparent from the following detailed description when taken in conjunction with the accompanying drawings.

DETAILED DESCRIPTION OF THE INVENTION

Figure 1:
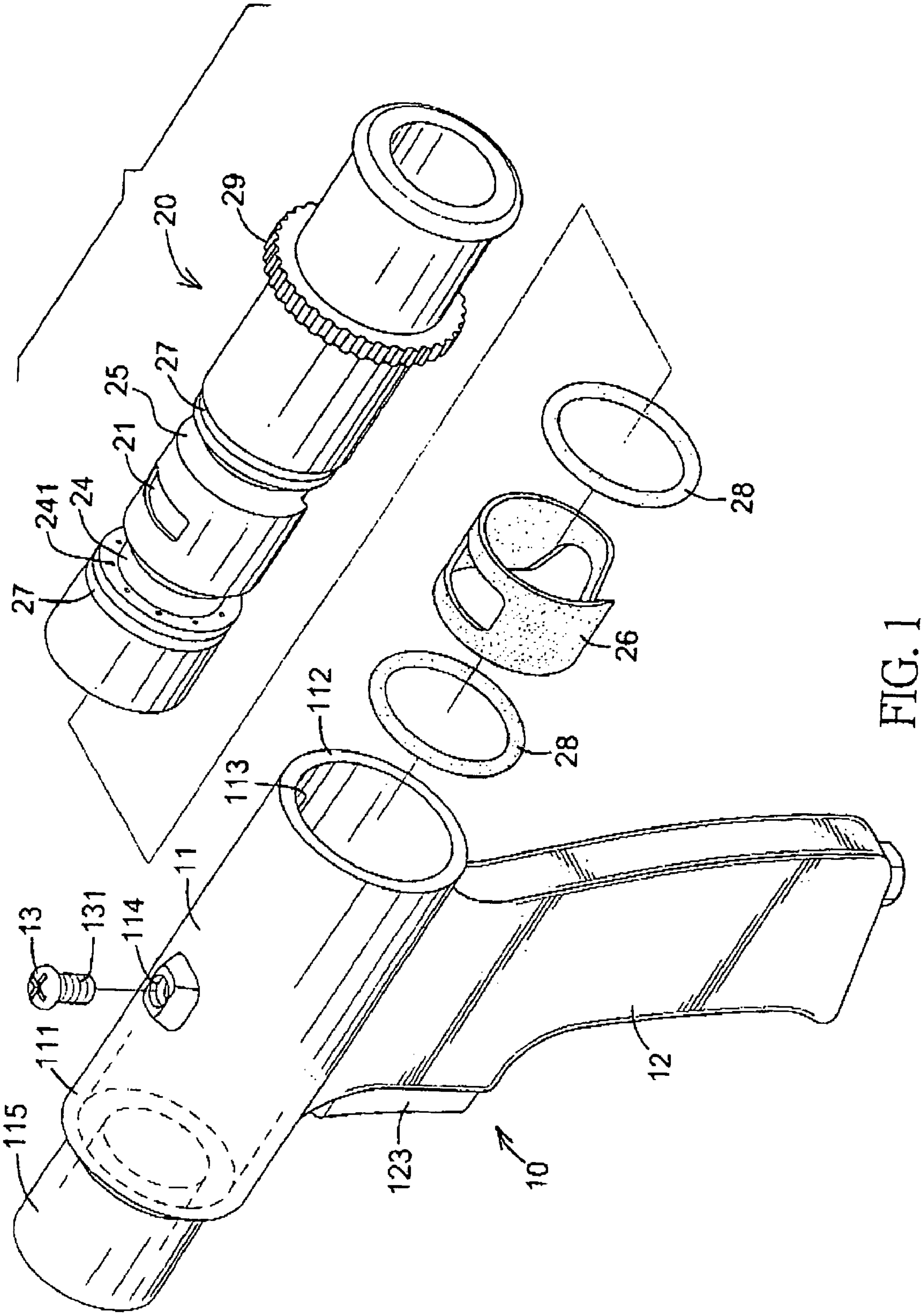
FIG. 1 is an exploded perspective view of a rotating bi-directional pneumatic gun in accordance with the present invention.
Figure 2:
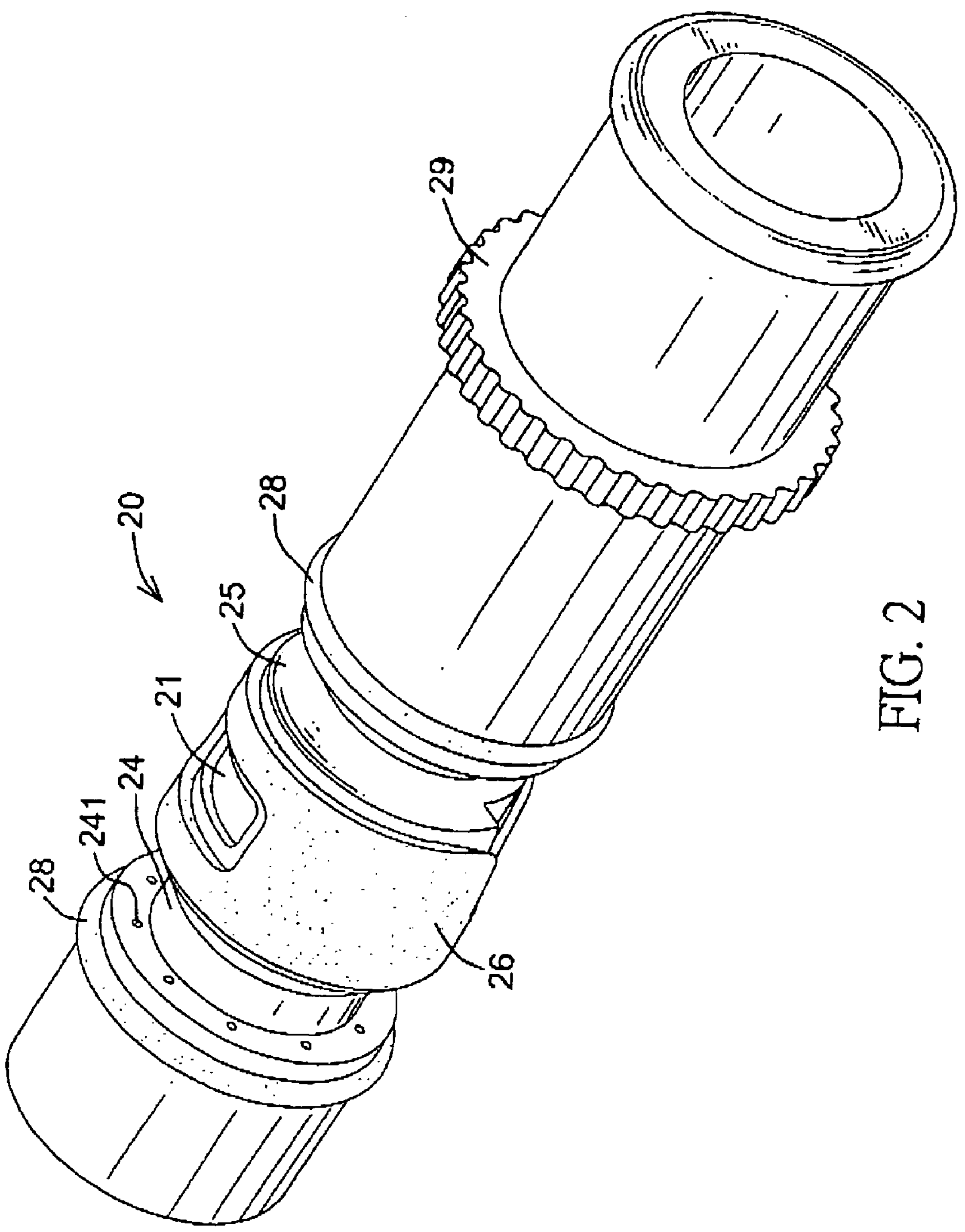
FIG. 2 is a perspective view of the guiding tube of the pneumatic gun in FIG. 1.
Figure 3:
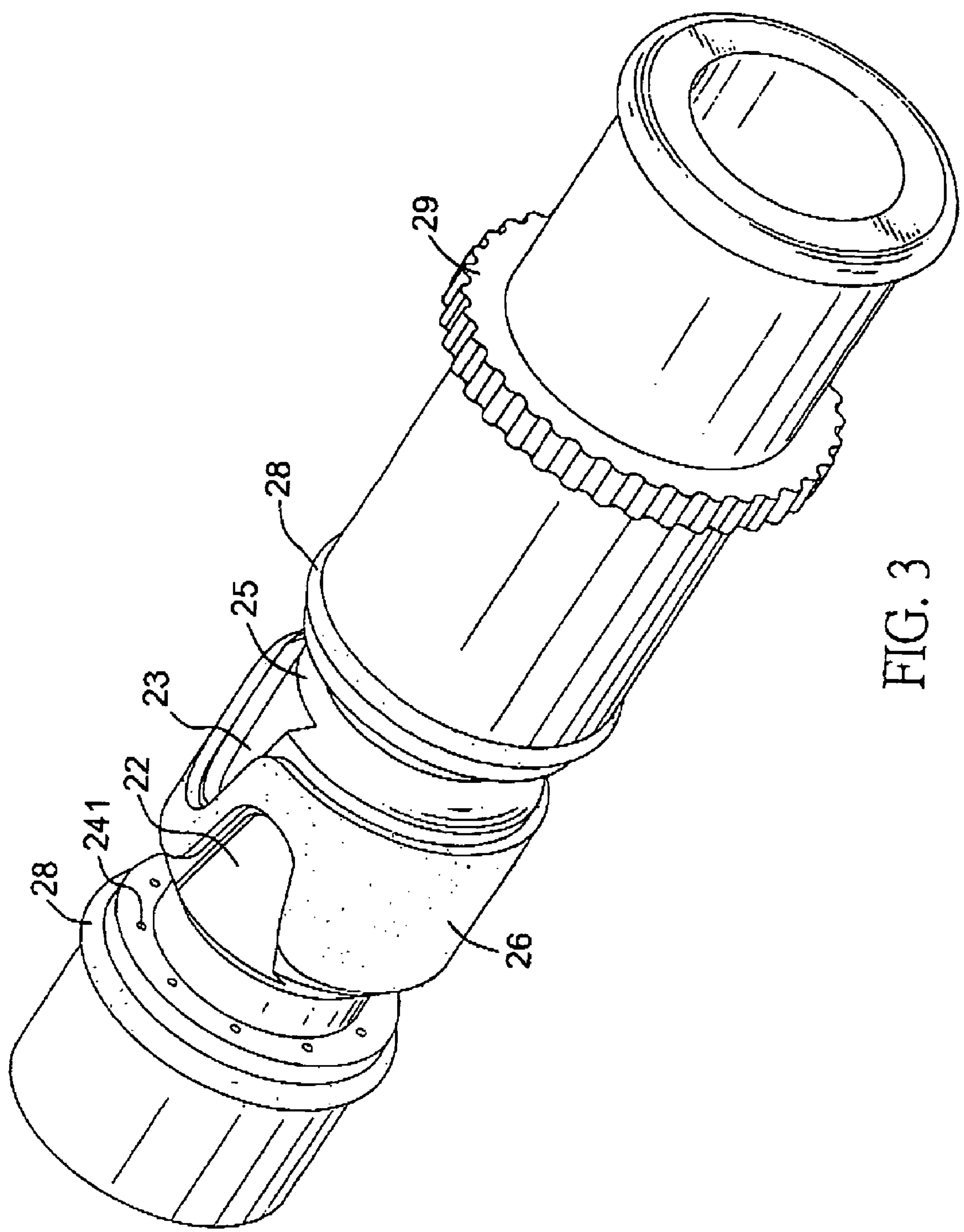
FIG. 3 is another perspective view of the guiding tube of the pneumatic gun in FIG. 1.

With reference to FIGS. 1-3, a rotating bi-directional pneumatic gun in accordance with the present invention comprises a body (10) and a guiding tube (20) mounted rotatably in the body (10). The body (10) has a barrel (11), a handle (12) and an optional positioning pin (13). The barrel (11) has a front end (111), a rear end (112), a passage (113) having a diameter, an outer surface, an optional positioning hole (114) having an inner thread and an optional connecting tube (115). The positioning hole (114) is defined in the outer surface of the barrel (11) and communicates with the passage (113). The connecting tube (115) is formed on the front end (111) of the barrel (11) and has an inner diameter and a blocking shoulder. The inner diameter of the connecting tube (115) is smaller than the diameter of the passage (113) so as to define the blocking shoulder between the connecting tube (115) and the passage (113).

Figure 4:
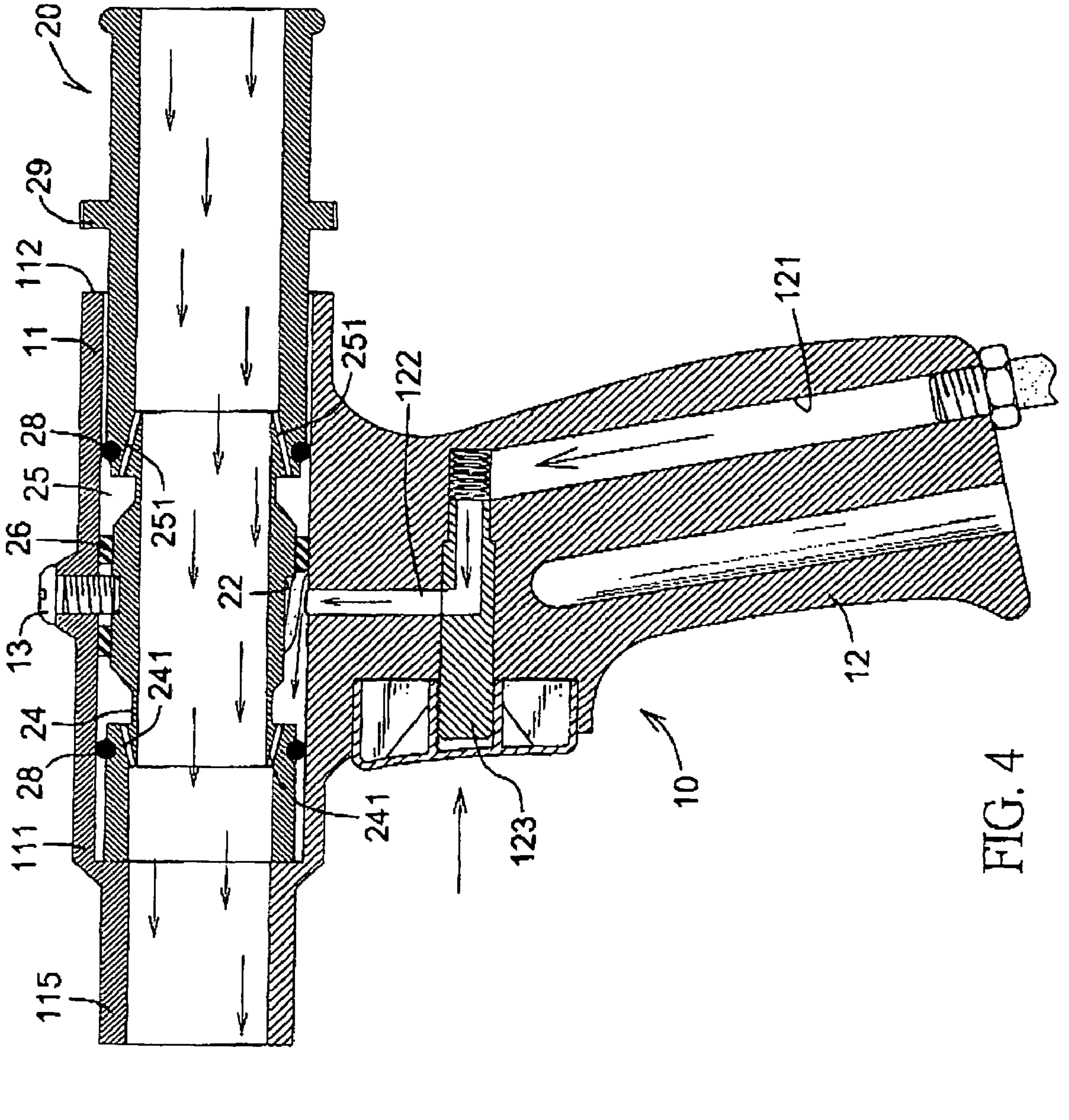
FIG. 4 is an operational side plane view in partial section of the rotating bi-directional pneumatic gun with compressed air being led toward the front end of the barrel.
Figure 5:
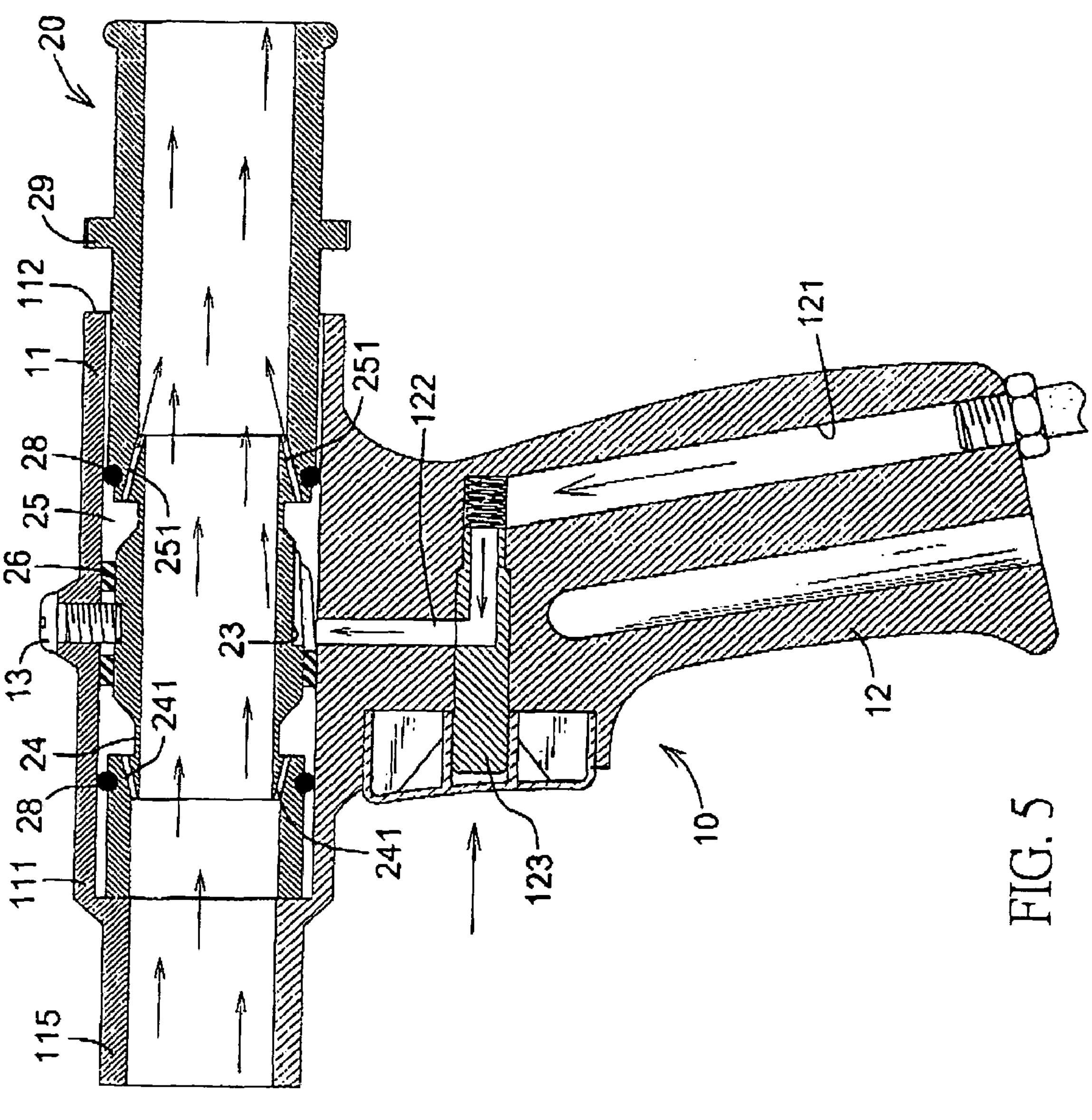
FIG. 5 is an operational side plane view in partial section of the rotating bi-directional pneumatic gun with compressed air being led toward the rear end of the barrel.
Figure 6:
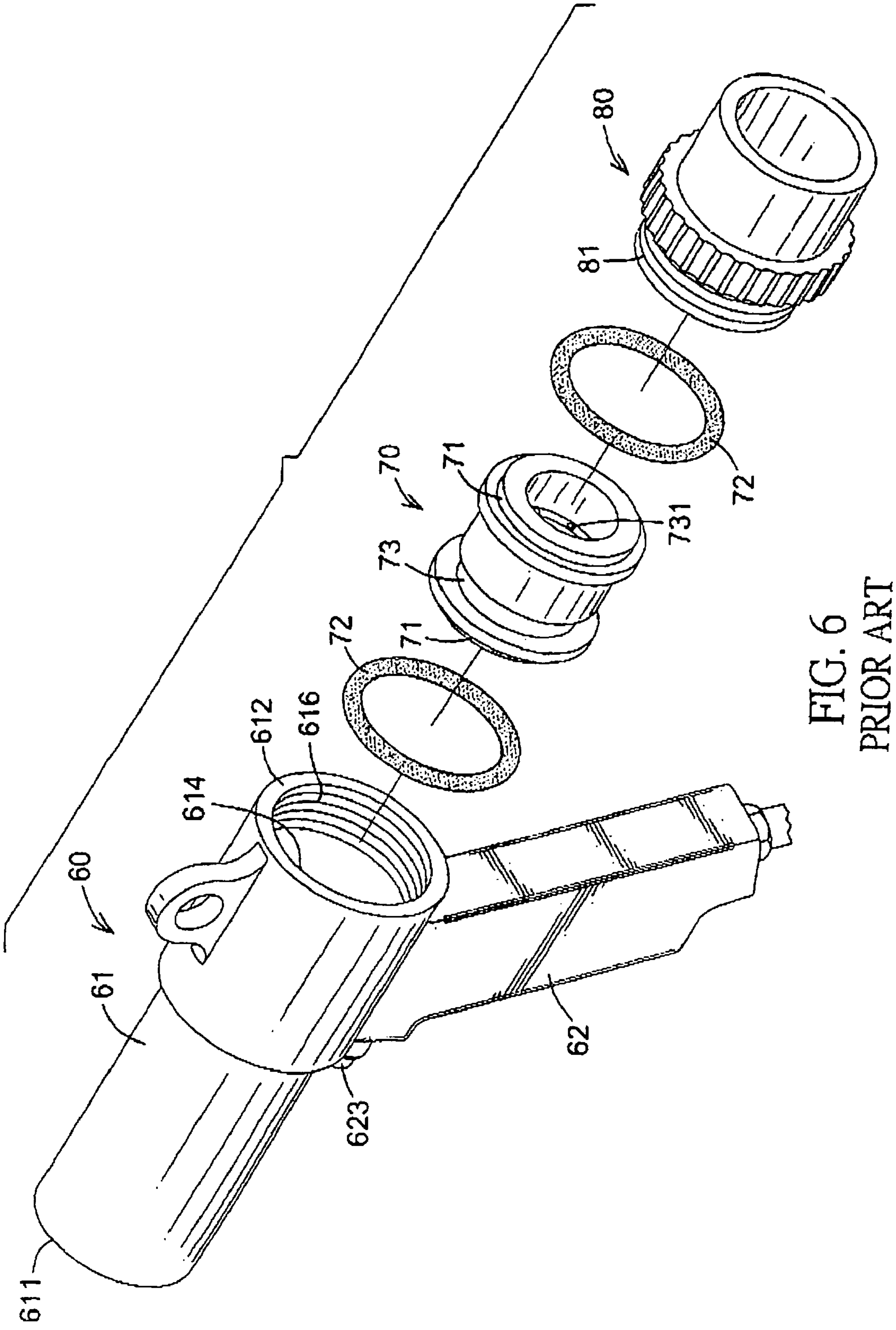
FIG. 6 PRIOR ART
FIG. 6 is an exploded perspective view of a conventional bi-directional pneumatic gun in accordance with the prior art.
Figure 7:
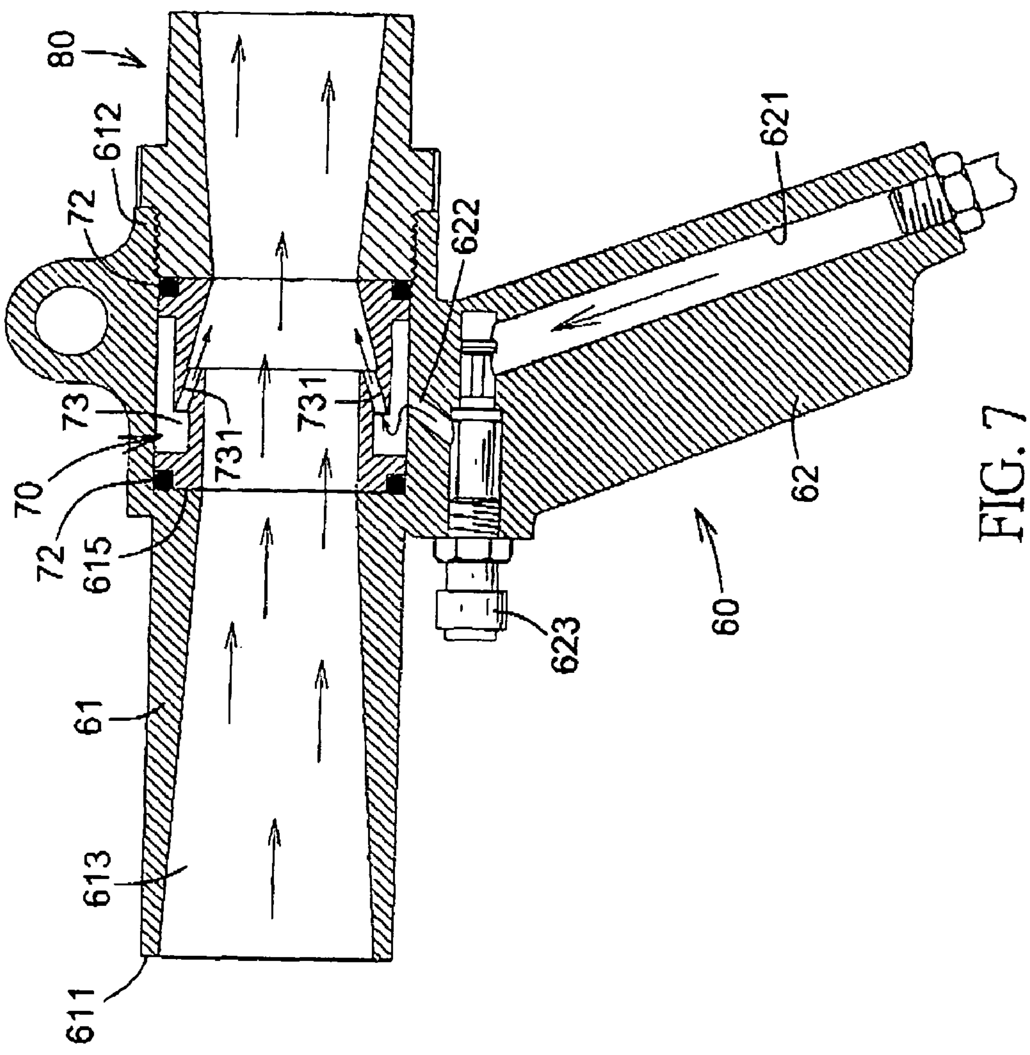
FIG. 7 PRIOR ART
FIG. 7 is an operational side plane view in partial section of the conventional bi-directional pneumatic gun with compressed air being led toward the rear end of the barrel.
Figure 8:
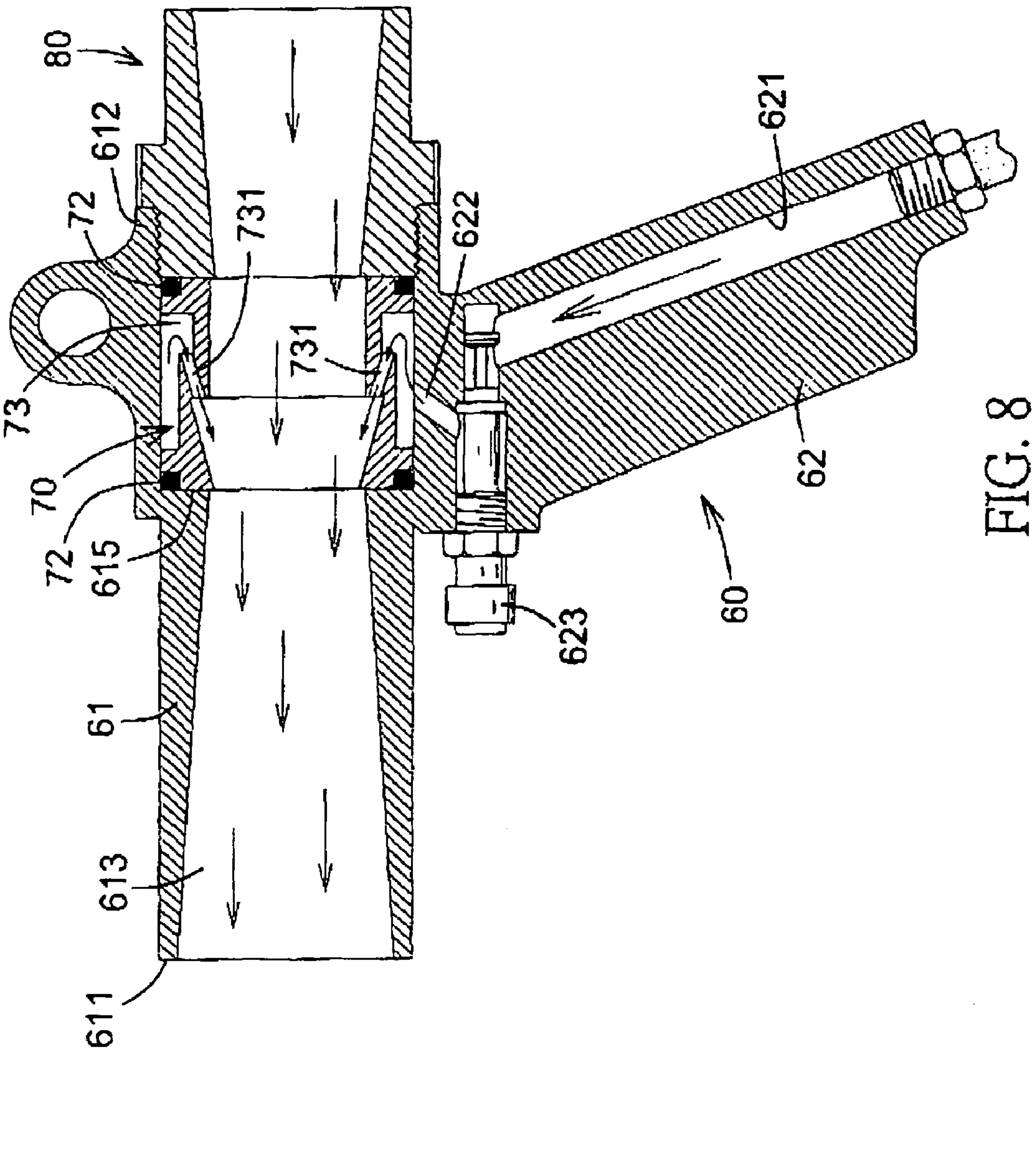
FIG. 8 PRIOR ART
FIG. 8 is an operational side plane view in partial section of the bi-directional pneumatic gun with compressed air being led toward the front end of the barrel.

With further reference to FIGS. 4 and 5, the handle (12) is attached to the outer surface of the barrel (11) and has a chamber (121), a connecting passage (122) and a valve device (123). The chamber (121) is connected to a compressed air source. The connecting passage (122) communicates with the passage (113) of the barrel (11). The valve device (123) is mounted between the chamber (121) and the connecting passage (122). When the valve device (123) is on, the connecting passage (122) is communicated with the chamber (121).

The positioning pin (13) has an outer thread (131), is screwed with the inner thread of the positioning hole (114) of the barrel (11) and protrudes into the passage (113) of the barrel (11).

The guiding tube (20) is mounted rotatably in the passage (113) of the barrel (11) and has an outer surface, a positioning slot (21), a front notch (22), a rear notch (23), a front groove (24), a rear groove (25), an optional airtight sleeve (26), two optional seal grooves (27), two optional seals (28) and an optional annular collar (29). The positioning slot (21) is defined in the outer surface of the guiding tube (20), aligns with the positioning hole (114) of the barrel (11) and holds the positioning pin (13) inside, so that rotating range of the guiding tube (20) is limited by the positioning slot (21).

The front notch (22) is defined longitudinally in the outer surface of the guiding tube (20). The rear notch (23) is defined longitudinally in the outer surface of the guiding tube (20) and is kept from communicated with the front notch (22). The connecting passage (122) of the handle (12) can be communicated alternatively with the front notch (22) or the rear notch (23) by rotating the guiding tube (20). The front groove (24) is defined around the outer surface of the guiding tube (20), communicates with the front notch (22) and has a sidewall and multiple inclined bores (241). The inclined bores (241) are defined through the sidewall and extend toward the front end (111) of the barrel (11). The rear groove (25) is defined around the outer surface of the guiding tube (20), communicates with the rear groove (23) and has a sidewall and multiple inclined bores (251). The inclined bores (251) are defined through the sidewall and extend toward the rear end (112) of the barrel (11).

The airtight sleeve (26) is mounted between the front groove (24) and the rear groove (25) and around the outer surface of the guiding tube (20). The airtight sleeve (26) has two cutouts corresponding respectively to the front notch (22) and the rear notch (23) to prevent the communication between the front notch (22) and the rear notch (23). The seal grooves (27) are defined respectively near the front end (111) and the rear end (112) of the barrel (11). The seals (28) are mounted respectively in the seal grooves (27). The annular collar (29) is formed on the outer surface of the guiding tube (20) outside the barrel (11) for facilely rotating of the guiding tube (20).

With reference to FIG. 4, the front notch (22) is communicated with the connecting passage (122). When the valve device (123) is on, compressed air in the chamber (121) flows through the connecting passage (122), the front notch (22), the front groove (24) and the inclined bores (241) and toward the front end (111) of the barrel (11). Therefore, the rotating bi-directional pneumatic gun can be served as a blower.

With reference to FIG. 5, when the guiding tube (20) is rotated to communicate the rear grove (23) with the connecting passage (122), the compressed air in the chamber (121) will flow through the connecting passage (122), the rear notch (23), the rear groove (25) and the inclined bores (251) and toward the rear end (112) of the barrel (11). Therefore, the rotating bi-directional pneumatic gun can be served as a suction device.

The rotating bi-directional pneumatic gun in accordance with the present invention is convenient to change the direction of air flow by rotating the guiding tube (20) without disassembling the rotating bi-directional pneumatic gun. The guiding tube (20) is an integral single piece, such that the rotating bi-directional pneumatic gun is easily assembled. In addition, the seals (28) are mounted in the seal grooves (27) and can be kept from sticking onto the barrel (11) even when the seals (28) are deteriorated. Furthermore, the length of the guiding tube (11) is prolonged to provide an enough force for sucking or blowing.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A rotating bi-directional pneumatic gun comprising:
- a body having
  - a barrel having
    - a front end;
    - a rear end;
    - a passage having a diameter, and
    - an outer surface; and
  - a handle being attached on the outer surface of the barrel and having
    - a chamber;
    - a connecting passage being communicated with the passage of the barrel; and a valve device being mounted between the chamber and the connecting passage and communicating the connecting passage with the chamber when the valve device is on; and a guiding tube being mounted rotatably in the passage of the barrel and having an outer surface;

a front notch being defined longitudinally in the outer surface of the guiding tube;

a rear notch being defined longitudinally in the outer surface of the guiding tube and kept from communicating with the front notch;

a front groove being defined around the outer surface of the guiding tube, communicating with the front notch and having a sidewall; and multiple inclined bores defined through the sidewall and extending toward the front end of the barrel; and a rear groove being defined around the outer surface of the guiding tube, communicating with the rear notch and having a sidewall; and multiple inclined bores defined through the sidewall and extending toward the rear end of the barrel.

2. The rotating bi-directional pneumatic gun as claimed in claim 1, wherein the barrel further comprises a positioning hole;

the guiding tube further comprises a positioning slot being defined in the outer surface of the guiding tube and aligning with the positioning hole of the barrel; and the body further comprises a positioning pin being inserted into the positioning hole and protruded into the positioning slot.

3. The rotating bi-directional pneumatic gun as claimed in claim 2, wherein the positioning hole has an inner thread; and the positioning pin has an outer thread and screws with the inner thread of the positioning hole.

4. The rotating bi-directional pneumatic gun as claimed in claim 3, wherein the guiding tube further comprises an airtight sleeve mounted between the front groove and the rear groove and around the outer surface of the guiding tube; and the airtight sleeve has two cutouts corresponding respectively to the front notch and the rear notch in the guiding tube.

5. The rotating bi-directional pneumatic gun as claimed in claim 4, wherein the guiding tube further comprises two seal grooves defined respectively near the front end and the rear end of the barrel and around the surface of the guiding tube; and two seals being mounted respectively in the seal grooves.

6. The rotating bi-directional pneumatic gun as claimed in claim 5, wherein the barrel further comprises a connecting tube formed on the front end of the barrel and has an inner diameter and a blocking shoulder;

the inner diameter of the connecting tube is smaller than the diameter of the passage; and the blocking shoulder is defined between the connecting tube and the passage.

7. The rotating bi-directional pneumatic gun as claimed in claim 6, wherein the guiding tube further comprises an annular collar formed on the outer surface of the guiding tube outside the barrel.

8. The rotating bi-directional pneumatic gun as claimed in claim 1, wherein the guiding tube further comprises an airtight sleeve mounted between the front groove and the rear groove and around the outer surface of the guiding tube; and the airtight sleeve has two cutouts corresponding respectively to the front notch and the rear notch in the guiding tube.

9. The rotating bi-directional pneumatic gun as claimed in claim 1, wherein the guiding tube further comprises two seal grooves defined respectively near the front end and the rear end of the barrel and around the surface of the guiding tube; and two seals being mounted respectively in the seal grooves.

* * * * *